US011013951B2

(12) United States Patent
Rothschild

(10) Patent No.: US 11,013,951 B2
(45) Date of Patent: May 25, 2021

(54) PLATFORM FOR ENABLING OMNIDIRECTIONAL MOVEMENT OF AN EXERCISING MACHINE

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

(21) Appl. No.: 15/837,768

(22) Filed: Dec. 11, 2017

(65) Prior Publication Data

US 2018/0161620 A1 Jun. 14, 2018

Related U.S. Application Data

(60) Provisional application No. 62/432,985, filed on Dec. 12, 2016.

(51) Int. Cl.
*A63B 21/005* (2006.01)
*A63B 22/00* (2006.01)
(Continued)

(52) U.S. Cl.
CPC ...... *A63B 22/0017* (2015.10); *A63B 22/0023* (2013.01); *A63B 22/02* (2013.01); *A63B 22/0257* (2013.01); *A63B 24/0087* (2013.01); *A63B 71/0622* (2013.01); *G06F 3/011* (2013.01); *G06Q 30/06* (2013.01); *G06Q 30/0643* (2013.01); *A63B 22/0235* (2013.01); *A63B 22/04* (2013.01); *A63B 22/0605* (2013.01); *A63B 2022/0271* (2013.01); *A63B 2022/0278* (2013.01); *A63B 2024/009* (2013.01); *A63B 2024/0096* (2013.01); *A63B 2071/063* (2013.01); *A63B 2071/0638* (2013.01); *A63B 2220/16* (2013.01); *A63B 2220/40* (2013.01); *A63B 2220/78* (2013.01); *A63B 2220/836* (2013.01);
(Continued)

(58) Field of Classification Search
None
See application file for complete search history.

(56) References Cited

U.S. PATENT DOCUMENTS 6,902,513 B1 * 6/2005 McClure ............ A63B 24/0006
 482/4
7,918,767 B1 * 4/2011 Wilson ................ A63B 21/153
 482/45
(Continued)

*Primary Examiner* — Mila Airapetian

(57) ABSTRACT

A platform for enabling omnidirectional movement of an exercising machine is disclosed. The platform may comprise a hemispherical inner body comprising a hollow cavity. The hollow cavity may be used for accommodating an exercising machine into the hollow cavity. The exercising machine may be one of a treadmill, treadclimber, and bicycle. The platform may further comprise an outer body. The outer body may be rotatably engaged with the hemispherical inner body. The rotatable engagement may allow an omnidirectional movement of the hemispherical inner body in a horizontal plane and an inclination and declination of the exercising machine. The platform further comprises a communication unit. The communication unit may be connected with the hemispherical inner body for receiving user's inputs for movement. At least one of the hemispherical inner body and the exercising machine may move based on the user's inputs for movement. The platform may also find use in virtual shopping environments to help a user in buying products.

11 Claims, 2 Drawing Sheets

(51) Int. Cl.
*A63B 22/02* (2006.01)
*A63B 24/00* (2006.01)
*A63B 71/06* (2006.01)
*G06Q 30/06* (2012.01)
*G06F 3/01* (2006.01)
*A63F 13/5375* (2014.01)
*A63B 22/04* (2006.01)
*A63F 13/235* (2014.01)
*A63B 22/06* (2006.01)

(52) U.S. Cl.
CPC ......... *A63B 2225/50* (2013.01); *A63F 13/235* (2014.09); *A63F 13/5375* (2014.09)

(56) References Cited

U.S. PATENT DOCUMENTS

| | | | | |
|---|---|---|---|---|
| 2008/0318741 A1* | 12/2008 | Sencil | .................. | A63B 21/068 482/96 |
| 2016/0346597 A1* | 12/2016 | O'Mara | ............. | A63B 22/0242 |
| 2018/0005312 A1* | 1/2018 | Mattingly | ................ | G06F 3/011 |

* cited by examiner

PLATFORM FOR ENABLING OMNIDIRECTIONAL MOVEMENT OF AN EXERCISING MACHINE

CROSS-REFERENCE TO RELATED APPLICATIONS

The present application claims priority to provisional application No. 62/432,985, filed on Dec. 12, 2012, the contents of both of which are hereby incorporated by reference.

FIELD OF THE DISCLOSURE

The present disclosure is generally related to electronic controls for exercising apparatus.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Equipments used for exercises are used since a long ago. One of the equipments that have gained undivided attention, over the years, is a treadmill. A treadmill is a portable equipment comprising a wide conveyor belt. The wide conveyor belt acts as a track for walking, jogging, or running, by a user. Previously, the treadmills used to be run manually. Belts of such treadmills need to be pushed behind by the feet of the user, while the user runs ahead.

The previous treadmills have now improved to power operated treadmills. In the power operated treadmills, an electric motor moves the wide conveyor belt linearly in a direction opposite to a running direction of the user. The constraint present with such treadmills direction of movement. Such treadmills allowed linear movement of the user in a forward direction only.

A recent development in the treadmills is an omnidirectional treadmill. On the omnidirectional treadmill, a user can move in any direction, unlike being limited only to a forward movement. There lacks a mechanism, even in the omnidirectional treadmills, to produce a circular motion while a linear motion is occurring on the treadmill. Further, the linear treadmills could only be adjusted to create an ascent and descent on the track. However, a rightwards or leftwards tilting of the treadmill could not be achieved to provide a real-life track condition.

The omnidirectional treadmills are also used in connection with Augmented Realty (AR) systems for playing games. The AR systems worn by a user captures data related to a movement of the user. Such data is transmitted to the omnidirectional treadmills and a belt of the omnidirectional treadmill as per the movement of the user.

Now, there is a need to integrate existing linear treadmills with the AR systems. Further, other exercising equipments like treadclimber, bicycle, and others also need integration with the AR systems. Such integration will also demand a freedom of movement of the exercising equipments, in any direction. Thus, a mechanism to allow free movement of the exercising equipments in any direction is desired.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a platform for enabling omnidirectional movement of an exercising machine is disclosed. The platform may comprise a hemispherical inner body. The hemispherical inner body may comprise a hollow cavity for accommodating an exercising machine into the hollow cavity. The exercising machine may be one of a treadmill, treadclimber, and bicycle. The platform may further comprise an outer body rotatably engaged with the hemispherical inner body. The rotatable engagement may allow a forward, backward, and an omnidirectional circular movement of the hemispherical inner body in a horizontal plane and an inclination and declination of the exercising machine. The platform may further comprise a communication unit. The communication unit may be connected with the hemispherical inner body for receiving user's inputs for movement. At least one of the hemispherical inner body and the exercising machine may move based on the user's inputs for movement.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e. g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," 'an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
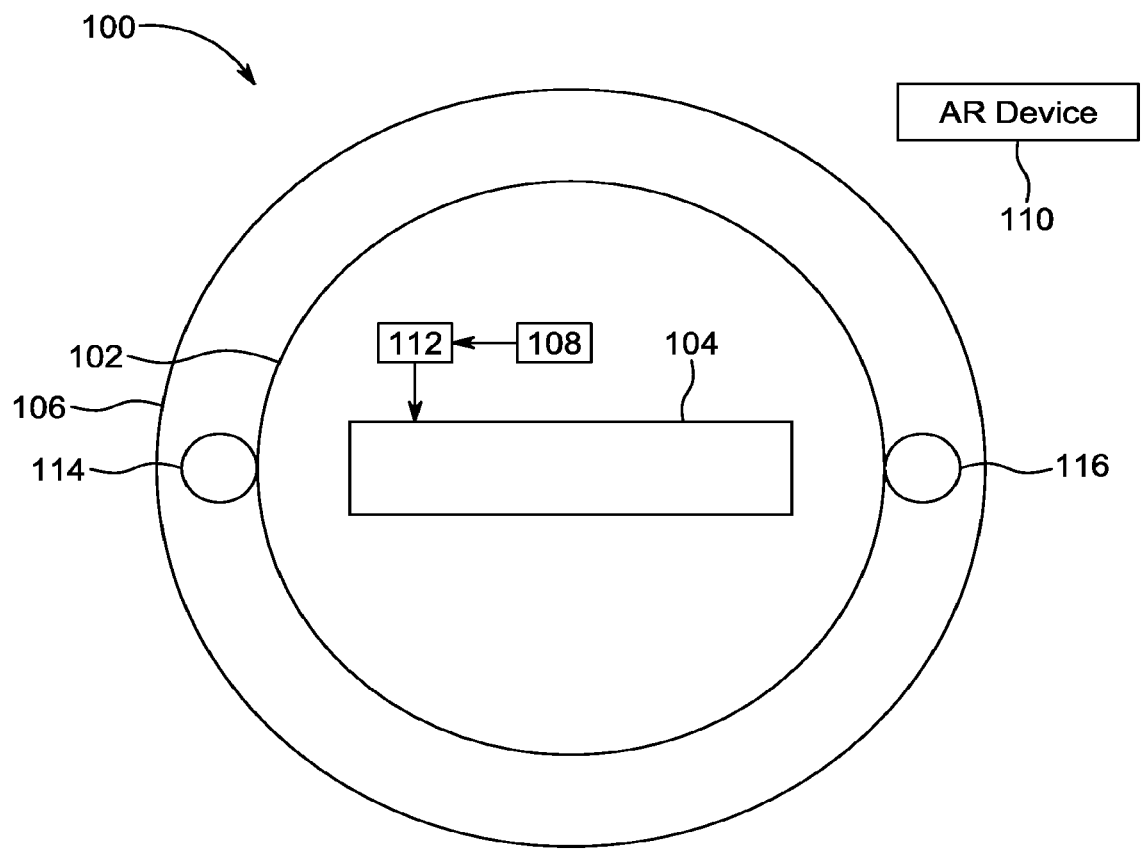
FIG. 1 illustrates a top view 100 of a platform for enabling omnidirectional movement of an exercising machine, according to an embodiment.
Figure 2:
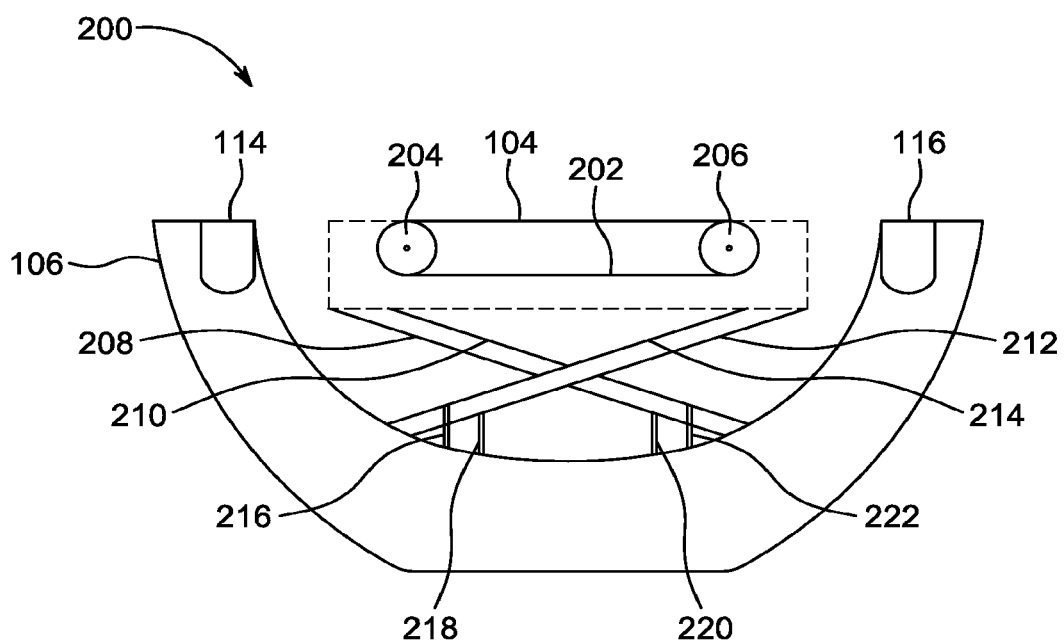
FIG. 2 illustrates a side view 200 of a platform for enabling omnidirectional movement of an exercising machine, according to an embodiment.

FIG. 1 illustrates a top view 100 and FIG. 2 illustrates a side view 200 of a platform for enabling omnidirectional movement of an exercising machine, according to an embodiment. The platform may now be explained by jointly referring to the top view 100 and the side view 200 of the platform.

In one embodiment, the platform may comprise a hemispherical inner body 102. The hemispherical inner body 102 may comprise a hollow cavity for accommodating an exercising machine into the hollow cavity. The exercising machine may be one of a treadmill, treadclimber, and bicycle. Further, the exercising machine may be another machine that could be accommodated in the hollow cavity.

In one exemplary embodiment, a linear treadmill may be accommodated into the hollow cavity of the hemispherical inner body 102. The linear treadmill may be fitted in the hollow cavity using locking mechanisms. The linear treadmill comprises a conveyor belt moving over rollers 204 and 206. The rollers 204 and 206 may be driven by an electrically powered motor.

Further, the conveyor belt may be seen comprising a top surface 104 and a bottom surface 202. The top surface 104 and the bottom surface 202 of the conveyor belt may roll over the rollers 204 and 206 to provide a continuous surface to a user.

In one embodiment, the platform may further comprise an outer body 106. The outer body 106 may be rotatably engaged with the hemispherical inner body 102. The rotatable engagement may allow an omnidirectional movement of the hemispherical inner body 102 in a horizontal plane. In one case, the hemispherical inner body 102 may be able to rotate across complete 360 degrees. In another case, the hemispherical inner body 102 may be able to make a movement of I degree. For making such minor transitory movements, a high power stepper motor 112 may be used to move the hemispherical inner body 102. The hemispherical inner body 102 may move the exercising machine (the linear treadmill) along with it.

In one embodiment, rollers (114 and 116) may be present on opposite edges of the outer body 106. The rollers (114 and 116) may be present contacting the hemispherical inner body 102. Movement of the rollers (114 and 116) may result in a circular motion of the hemispherical inner body 102. The rollers (114 and 116) may be moved accordingly to generate a clockwise and an anti-clockwise movement of the hemispherical inner body 102.

In one embodiment, an inclination and declination of the exercising machine (linear treadmill) may also be achievable by the rotatable engagement. Further, the hemispherical inner body 102 may also incline or decline along with the linear treadmill. Such movement may provide a user with a realistic experience. Post making the movement based on the user's inputs, the hemispherical inner body 102 may move back into its original position. In one case, the rotatable engagement may be established using at least one of ball bearings, internal gears, external gears, rack and pinion gears, and double helical gears.

In one embodiment, a cross stand may be present to support a base of the treadmill. The base of the treadmill is illustrated in FIG. 2 using dotted lines. The cross-stand rests on an inner surface of the hemispherical inner body 102. The cross-stand comprises two arms (208 and 210) to support a front portion of the treadmill. Further, the cross-stand comprises two arms (212 and 214) to support a rear portion of the treadmill. The cross-stand may be designed to comprise more than two arms for supporting the front portion and the rear portion of the treadmill.

In one embodiment, the arms (212 and 214) supporting the rear portion of the treadmill may be connected with positioning cylinders (218 and 216). Further, the arms (208 and 210) supporting the front portion of the treadmill may be connected with positioning cylinders (220 and 222). Each of the positioning cylinders may be hydraulic, pneumatic, or electromagnetic in nature.

In one embodiment, different positioning cylinders may be actuated to produce an ascending slope, descending slope, and tilting of the treadmill. In one case, the positioning cylinders (220 and 222), connected to the arms (208 and 210) supporting the front portion of the treadmill, may be actuated. Actuating the positioning cylinders (220 and 222) may result in lifting of the front portion of the treadmill, and thus generating the ascending slope on the treadmill. On the other hand, the positioning cylinders (216 and 218), connected to the arms (214 and 212) supporting the rear portion of the treadmill, may be actuated. Actuating the positioning cylinders (216 and 218) may result in lifting of the rear portion of the treadmill, and thus generating the descending slope on the treadmill.

In one embodiment, the positioning cylinders (222 and 216), connected to the arms (210 and 214) supporting the right side of the treadmill, may be actuated. Actuating the positioning cylinders (222 and 216) may result in tilting of the treadmill towards the left side. On the other hand, the positioning cylinders (220 and 218), connected to the arms (208 and 212) supporting the left side of the treadmill, may be actuated. Actuating the positioning cylinders (220 and 218) may result in tilting of the treadmill towards the right side.

In one embodiment, a communication unit 108 may be connected with the hemispherical inner body 102. The communication unit 108 may be used to receive user's inputs for movement. At least one of the hemispherical inner body 102 and the exercising machine (treadmill) may make movement, based on the user's inputs for movement. The communication unit 108 may be connected to a motor 112, for operating the treadmill based on the user's inputs.

In one embodiment, controls may be present on the platform. Further, the controls may, alternatively or in addition, be present on the exercising machine. The controls may be present in form of hard buttons like push buttons and switches or soft buttons like touch sensors. Such controls may be used to transmit the user's inputs.

In an alternate embodiment, the user may use a joystick for providing user's inputs. The controls present on the joystick may be operated by the user to send the user's inputs. The joystick may be connected to the communication unit 108 by at least one of a wired and wireless communication medium. The communication unit 108 may use the user's inputs to control the platform.

In another embodiment, the user's inputs may be transmitted to the communication device 108 by an Augmented Reality (AR) device 110. The AR device 110 may communicate wirelessly through Wireless Fidelity (Wi-Fi), Bluetooth, microwaves, Radio frequencies or any other communication technique known in the art. Similarly, in another case, voice instructions may be sent as user's inputs to the communication device 108. Voice instructions like move ahead, move backward, move right, move left, fast, slow, and stop may be used as the user's inputs to control the platform.

In one embodiment, the user may wear the AR device 110 to simulate an artificial environment. For example, the simulated artificial environment may be of a racing event. The user may run on the treadmill while wearing the AR device 110. The AR device 110 may comprise an accelerometer for transmitting motion and speed signals as the user's inputs. Further, the AR device 110 may comprise a gyrometer for transmitting direction signals as the user's inputs. Other sensors known in the art may also be used for transmitting additional data by the AR device 110. The sensors present in the AR device 110 may help in synchronizing contents of the augmented reality shown to the user with the platform, to provide a realistic experience to the user.

During the racing event, relevant visuals may be shown to the user, by the AR device 110. The user may be informed to choose one track amongst multiple tracks, for moving ahead. The user may be informed through speakers connected to the linear treadmill. The user may provide the user's data to select the one track by using one of the controls present on the platform, controls present on the linear treadmill, and joystick. In one case, a movement of the user's head may indicate selection of the track. The sensors present in the AR device 110 may transmit the user's inputs for selection of the track. In one case, the gyrometer may transmit the user's inputs for selection of the track.

The linear treadmill may thus move in a clockwise and anti-clockwise direction, and may incline or decline based on the user's inputs. Further, the linear treadmill may move in a forward and backward direction. The conveyor belt continues moving so that the user can walk or run over the conveyor belt. The omnidirectional movement of the treadmill is a result of the circular motion, forward motion, backward motion, inclination, declination, and tilting of the treadmill. Thus, the above described platform may modify the linear treadmill into an omnidirectional treadmill.

Similarly, other exercising machines may also be used on the platform to increase directions of movement of the user.

Thus, the above explained platform increases degrees of freedom, for movement of the user using an exercising machine.

Figure 3:
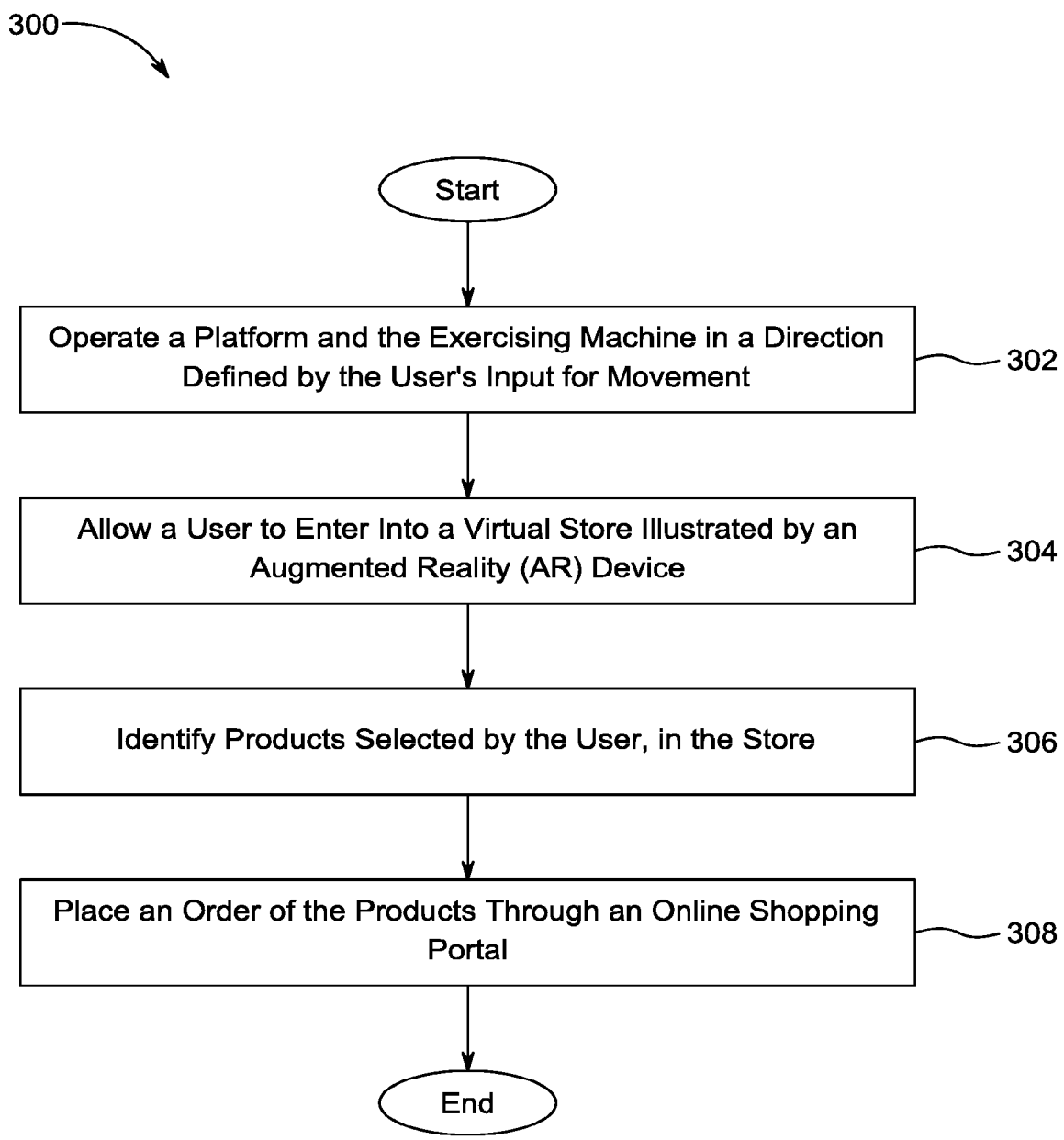
FIG. 3 illustrates a flowchart 300 of a method of allowing a user to make an electronic purchase of products using an Augmented Reality (AR) device 110 and the platform.

FIG. 3 illustrates a flowchart 300 of a method of allowing a user to make an electronic purchase of products using an Augmented Reality (AR) device 110 and the platform, according to an embodiment. FIG. 3 comprises a flowchart 300 that is explained in conjunction with the elements disclosed in FIG. 1 and FIG. 2. The flowchart 300 starts at the step 302 and proceeds to step 308.

At step 302, the platform and the exercising machine may be operated in a direction defined by the user's input for movement. A user wearing the AR device 110 may be shown to be walking on a road. To move further on the road, the user may start moving on the treadmill mounted on the platform. While walking, the user may come across a virtual store for shopping.

At step 304, the user may be allowed to enter into the virtual store. The user walking on the treadmill may be illustrated to have reached inside the virtual store. The user may then see products arranged inside the store. The user may go near the products and may pick or point towards the products for buying.

At step 306, the products selected by the user may be identified. The AR device 110 may identify the products selected by the user. The AR device 110 may search the products on an online shopping portal.

At step 308, an order of the products may be placed on the online shopping portal. The order may be placed to a registered address of the user.

The above described platform may find other several uses in fields other from the ones explained above.

What is claimed is:

1. A platform for enabling omnidirectional movement of an exercising machine, the platform comprising:
   a hemispherical inner body comprising a hollow cavity for accommodating an exercising machine into the hollow cavity, wherein the exercising machine is one of a treadmill, treadclimber, and bicycle;
   an outer body rotatably engaged with the hemispherical inner body for allowing a forward, backward, and an omnidirectional circular movement of the hemispherical inner body in a horizontal plane and an inclination and declination of the exercising machine; and
   a communication unit, connected with the hemispherical inner body, for receiving user's inputs for movement, wherein at least one of the hemispherical inner body and the exercising machine moves based on the user's inputs for movement.

2. The platform of claim 1, wherein the rotatable engagement is established using at least one of ball bearings, internal gears, external gears, rack and pinion gears, and double helical gears.

3. The platform of claim 1, further comprising a cross-stand supporting a base of the exercising machine and positioned on an inner surface of the hemispherical inner body, wherein the cross-stand comprises at least two arms on each on front and back to support a front portion and a rear portion of the exercising machine.

4. The platform of claim 3, further comprising at least four positioning cylinders to adjust elevation of each arm of the cross-stand.

5. The platform of claim 4, further comprising tilting the exercising machine by activating the positioning cylinders on either of a right side or a left side of the exercising machine.

6. The platform of claim 1, wherein the user's inputs are provided using controls present on at least one of the platform and the exercising machine.

7. The platform of claim 1, wherein the user's inputs are provided using an Augmented Reality (AR) device.

8. The platform of claim 7, wherein the AR device comprises an accelerometer for transmitting motion and speed inputs and a gyrometer for transmitting direction inputs.

9. The platform of claim 1, further comprising moving the platform along with a movement of the exercising machine.

10. The platform of claim 1, wherein the circular movement can range from 1 degree to 360 degrees.

11. The platform of claim 1, further comprising allowing a user to make an electronic purchase of products using an Augmented Reality (AR) device by:
   operating the platform and the exercising machine in a direction defined by the user's inputs for movement;
   allowing a user to enter into a virtual store illustrated by the AR device, based on movements of the user on the exercising machine;
   identifying products selected by the user in the store, wherein the products are illustrated by the AR device; and
   placing an order of the products through an online shopping portal.

* * * * *